United States Patent [19]

Johnson

[11] 3,926,372
[45] Dec. 16, 1975

[54] GUARD FOR SELF-PROPELLED SPRINKLING APPARATUS

[76] Inventor: H. Gordon Johnson, 3502 Rangeview Road, Greeley, Colo. 80631

[22] Filed: Oct. 2, 1974

[21] Appl. No.: 511,165

[52] U.S. Cl. ............... 239/177; 137/344; 239/178; 239/212
[51] Int. Cl.² .......................................... B05B 3/12
[58] Field of Search ........... 239/172, 173, 177, 178, 239/212, 213; 137/344

[56] References Cited
UNITED STATES PATENTS

| | | | |
|---|---|---|---|
| 3,484,046 | 12/1969 | Harris | 239/212 X |
| 3,762,643 | 10/1973 | Allen, Jr. | 239/212 |
| 3,780,947 | 12/1973 | Ririe et al. | 239/177 |

Primary Examiner—Robert S. Ward, Jr.
Assistant Examiner—Andres Kashnikow
Attorney, Agent, or Firm—Van Valkenburgh, Lowe & Law

[57] ABSTRACT

A guard for each chain which drives the sprocket on a wheel of a carriage of a self-propelled sprinkling apparatus. The guard comprises a pair of rings, circular in cross section, which are attached to the sprocket but in a position both outwardly and laterally from the sprocket teeth.

10 Claims, 4 Drawing Figures

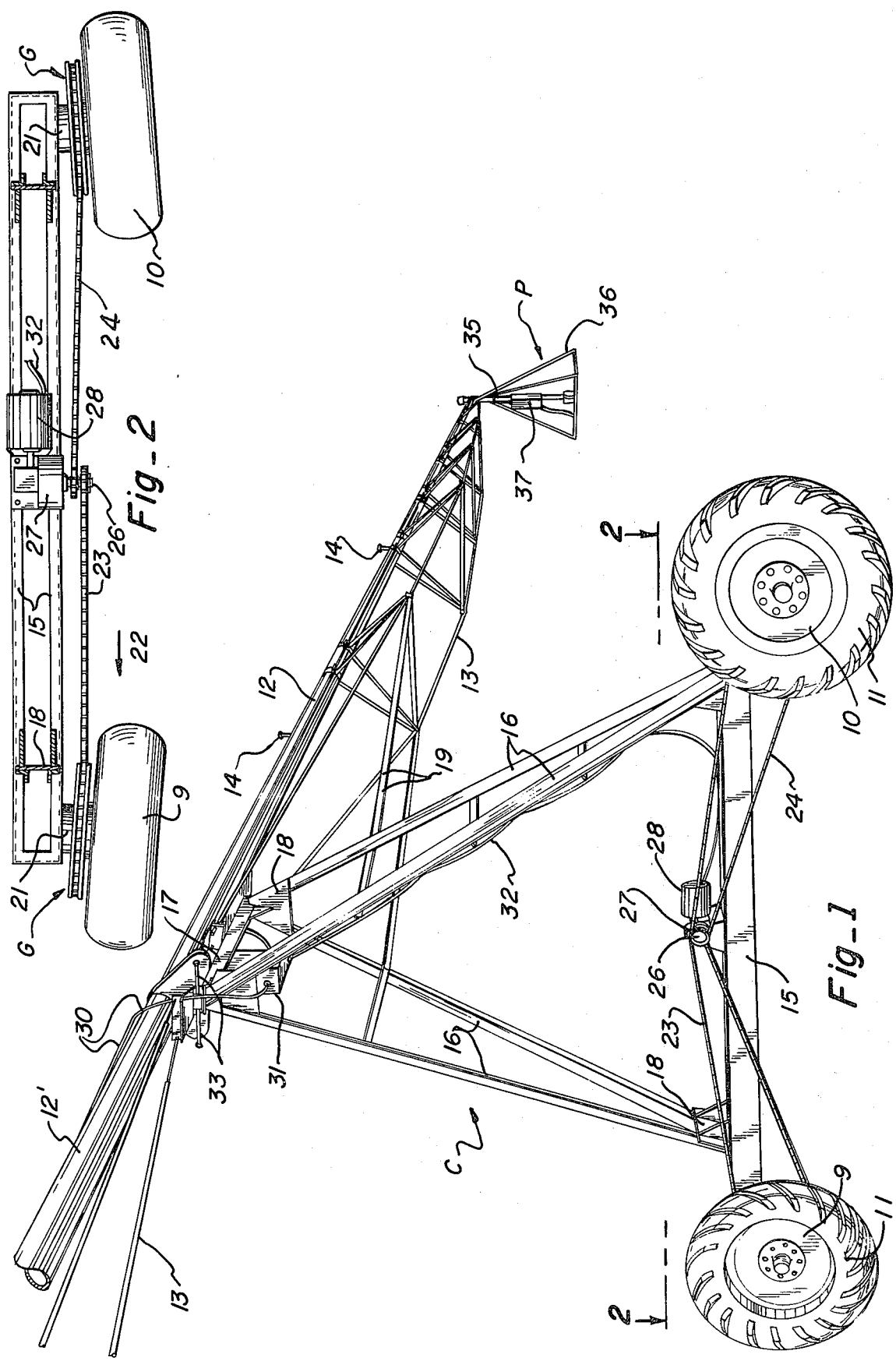

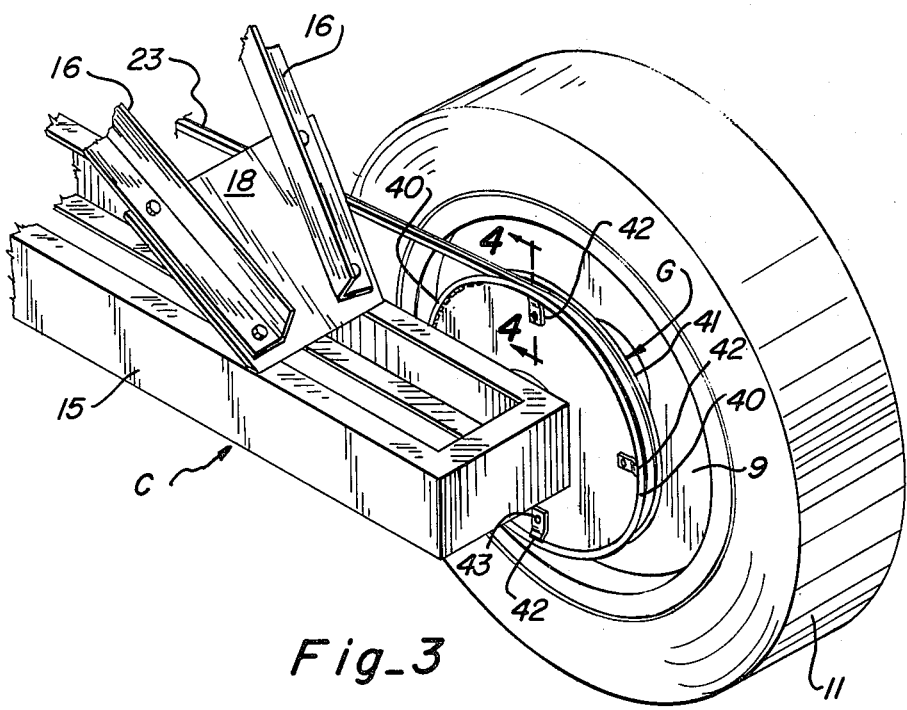
Fig_3
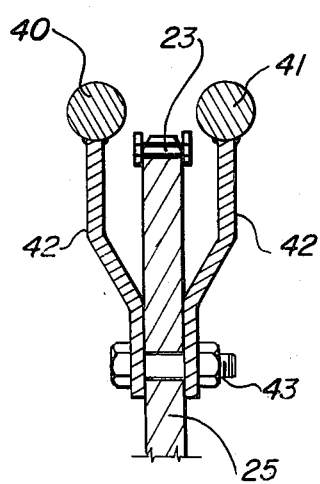
Fig_4

GUARD FOR SELF-PROPELLED SPRINKLING APPARATUS

This invention relates to self-propelled sprinkling irrigation apparatus.

This invention is of primary importance for self-propelled irrigation apparatus which travels in a circle, around a center pivot, but is also useful in elongated self-propelled sprinkling apparatus which travels in a straight line and is reversed to return to its initial position, again travelling in a straight line. The basis for modern sprinkling irrigation apparatus travelling in a circle is Zybach U.S. Pat. No. 2,604,359, as well as additional Zybach patents directed to improvements thereon. This original apparatus utilized a water activated, reciprocating drive motor at each of a number of pipe carrying carriages rotatable about a central pivot, to which water from a well or the like is supplied by a pump located either on or off the area being sprinkled.

A number of variations of this apparatus were developed, such as represented by the Clark D. Bower et al. U.S. Pat. No. 3,394,729, which discloses an electric drive motor at each carriage. The Bower et al. construction also utilizes a flexible joint at each carriage on which to pivot the pipe of the next outer carriage, with a flexible coupling conducting water from one section of pipe to the next outer section. The carriages are spaced apart on the order of 100–160 feet, and each pipe section carries a plurality of sprinklers with a gradation in size or spacing to produce a smaller output on the pipe section next to the pivot, and an increasing output outwardly, with the sprinklers of greatest output on the outer section of pipe. This gradation in size of the sprinklers provides an equal distribution of water on the crop, since the ring-shaped area beneath a specific section of pipe varies in area from the inside pipe section to the outermost pipe section in accordance with the square of the radius of movement of the respective pipe sections. The variation of sprinkler size and/or output will thus equalize the water which various areas of the crop receive.

The reciprocating water motor of the Zybach construction utilizes a pawl and ratchet construction to turn either one or both wheels on a carriage and therefore tends to be self-cleaning with respect to the entry of crop stalks, such as corn stalks, or stones, into the mechanism. An electric motor and speed reducer drive is more effective than the water drive, especially when both wheels of a carriage are directly connected to the motor as by drive chains. There is, however, a tendency for the crop, such as corn stalks, to impede the operation by wedging between the chain and sprocket of the drive mechanism, to possibly break the chain or cause it to slip off the sprocket, or even to overload the motor and blow a fuse, with the result of bringing the entire mechanism to a standstill. Not only will a plant wedge between a chain and sprocket but also, a stone or board will sometimes wedge between the chain and sprocket with similar undesirable results. When a carriage is stopped in this manner, other problems can occur. The outermost carriage is set to travel at a predetermined rate, based on the radius of its area and the amount of water which the sprinklers are designed to deliver onto the crop in that area. Thus, the drive for the next inner carriage would be turned on a sufficient portion of the time to enable it to catch up with the outermost carriage, with each carriage, in essence, tending to keep up with the next outer carriage. However, the stoppage of an intermediate carriage causes those inwardly from the stopped carriage to move into alignment with it and then stop, but those outwardly from it to keep on moving in an attempt to keep up with the preset outermost carriage. Thus, the portion of the pipe sections outwardly from the stopped carriage tends to move on ahead, with the consequent possibility of complete misalignment of the outer carriages, as well as the possibility of breakage of parts, as at the stopped carriage.

Another factor which tends to cause drive chains to become disengaged from a driven sprocket is the "toe in" and "toe out" position of the drive wheels, particularly those adjacent the center pivot. Since each carriage travels in a circle, it has been found that more effective traction could be secured by placing the pivot shaft for each drive wheel perpendicular to a tangent to the circle of rotation of the respective carriage. Thus, each drive wheel will be moving in the actual direction in which the carriage is to be moved, but each driven sprocket is at an angle to the path of the chain.

Fortunately, it has been found that a solution to the stalk or stone collecting problem can also solve the toe in and toe out problem. This is accomplished by mounting a guard on each driven sprocket which is spaced from the teeth of the sprocket and rotates therewith. A guard is mounted on each side of the sprocket, as by brackets attached to the sprocket, and is circular in configuration to correspond to the sprocket and conveniently is also circular in cross section. Since the guard extends outwardly from the outer edges of the sprocket teeth and is also spaced laterally from the sprocket teeth, at each side, stalks or stones which, otherwise might tend to move between the chain and sprocket first encounter the guard and are ordinarily diverted. The lateral spacing of the guard permits a plant, leaves or the like, which actually come between the chain and sprocket, to be chewed up and expelled through the lateral space between the guard and the sprocket.

Additional details of a preferred construction of the guard for driven sprockets of self-propelled sprinkling irrigation apparatus will become apparent from the description which follows, taken in conjunction with the accompanying drawings, in which:

FIG. 1 is a perspective view of the first carriage and the center pivot of a circular sprinkling irrigation apparatus which utilizes the principles of this invention.

FIG. 2 is a top plan view of the drive wheels and base of the first carriage, taken from the position of line 2—2 of FIG. 1.

FIG. 3 is a perspective view, on an enlarged scale, of one of the carriage driving wheels and associated parts, looking in the opposite direction to FIG. 1.

FIG. 4 is a fragmentary cross section, on an enlarged scale, taken along line 4—4 of FIG. 3.

A circular sprinkling irrigation apparatus, as in FIG. 1, includes a central pivot P and a first carriage C supported upon front and rear driving wheels 9 and 10 respectively, each wheel being provided with a tire 11. Supported between the pivot P and the carriage C is a pipe section 12, with a similar pipe section 12' supported between the carriage C and the next carriage of the sprinkler system. Each pipe section is maintained in its upper position at the top of the carriages by a truss structure 13, while the pipe sections carry sprinklers 14. The sprinkler system will conveniently rotate, either completely or back and forth in an arc, in order to spray water onto the crop area traversed by the sprinkler system. As indicated previously, the capacity of the sprinklers 14 for the first pipe section 12 is generally less than the sprinklers for the pipe sections 12', with an increase in capacity of the sprinklers toward the outer end.

The carriage C includes a lower beam 15 which may be rectangular and formed by opposed channels, as shown, while diverging triangular frame sides 16 are inclined upwardly, at each side, to a frame top 17 on which pipe 12' is pivoted. The sides 16 of the frame may be formed of angles with reinforcing gussets 18, as shown, while a pair of struts 19 extend from the respective frame sides to the truss structure for the pipe section 12, to produce movement of the pipe section 12 and carriage C as a unit. The wheels 9 and 10 are similarly constructed and each is mounted on a pivot shaft 21 of FIG. 2 which is adjustable angularly with respect to the beam 15 on which it is mounted. When the sprinkler is to be moved in a clockwise direction, as indicated by the arrow 22 of FIG. 2, the front wheel 9 is toed in, while the rear wheel 10 is toed out, as shown. The toe in and toe out of the wheels may be on the order of 4° for the first carriage, for a pipe section length of 100 feet, and to a lesser extent for the carriages outwardly therefrom.

Assuming that the sprinkler is to irrigate an area approximately one-half mile on each side, a quarter section, the length of the piping may be on the order of 1300 feet, with an end sprinkler reaching an area beyond the pipe. Even so, the sprinklers will encounter such and other conditions which will render a drive, which drives both wheels of the carriage, very desirable. The sprinklers will discharge water preferably to the rear of the pipe sections, in order to minimize wetting of the ground at the position of the drive wheels and the production there of muddy or slippery conditions.

The wheels 9 and 10, having tires 11, are driven through the respective chains 23 and 24, as in FIG. 1. The lower reach of front chain 23 is generally taut, as it moves in the direction of the arrow 22 shown, with the upper reach slackened somewhat. The upper reach of rear drive chain 24, however, is tensioned, with the lower reach being slackened somewhat. Each chain 23 and 24 engages a driven sprocket 25 mounted on the respective shaft 21 and also engage a dual drive sprocket 26 which, in turn, is driven at an appropriate speed by a speed reducer 27, in turn driven by a motor 28 and mounted centrally of beam 15. The taut reach of each chain moves from the driven sprocket 25 and to the drive sprocket 26 while the slack reach of each chain moves from the drive sprocket 26 to the driven sprocket 25. A power supply electrical cable 30 extends along the top of each pipe section 12 to enter a control box 31 mounted at the upper end of each carriage and proceeding from the control box along the next pipe section. An electric cable 32 extends from control box 31 downwardly along one of the frame sides 16 of the carriage and thence along the beam 15 to the motor 28. Needless to say, the motor 28 and speed reducer 27 should be totally enclosed in a waterproof manner, while the control box 31 should also, when closed, be waterproof.

Connected to the next pipe section 12' are a pair of arms 33 which may be constructed in accordance with the aforesaid Clark D. Bower et al. U.S. Pat. No. 3,394,729 or Harry C. Bonds et al. U.S. Pat. No. 3,606,160. As will be evident, if the carriage C lags behind the next carriage, the arms 33 and associated mechanism will, due to the pivoting of pipe section 12' on the carriage C, close a control switch within box 31 to start the motor 28 and initiate driving movement of the carriage C. As soon as the carriage C catches up with the next outer carriage, the drive motor may be stopped. Or, if desired, the controls may be set so that the drive motor 28 is not stopped until the carriage C is slightly ahead of the next carriage. Power to the unit may be obtained from a suitable source, with the electrical cable buried along with the water supply pipe in the field and extending to the center pivot P. The center pivot may be provided with a telescoping joint 35 and supporting framework 36, as shown, with a power transformer 37 mounted on the lower portion of the telescoping joint.

In accordance with this invention, each driven sprocket 25 is provided with a pair of guards G, each of which encircles the sprocket at each side thereof. Without a guard any stalk, stone or the like which may be pushed or thrown against the driven sprocket and chain might enter between the slack reach of the chain and the sprocket to impair the drive. Each guard is spaced laterally and circumferentially outwardly from the toothed periphery of the sprocket. As in FIG. 4, the guard may be formed of a pair of rings 40 and 41, each circular in shape, having an outer diameter greater than the outer diameter of the corresponding drive sprocket 25. Conveniently, the rings 40 and 41 are circular in cross section and may be solid or tubular, as shown. A series of brackets 42 support the rings 40 and 41 from the drive sprocket 25. Brackets 42 are shaped for attachment, as by welding, to the outside of the respective ring and for attachment, as by a bolt 43, to the sprocket 25. The brackets 42 may be spaced about the sprocket 90° apart, as shown, with four brackets on each side of the drive sprocket. However, the form or shape and number of brackets may be changed, if desired. As will be evident from FIGS. 3 and 4, any stalk, stone or the like tending to enter between a drive chain and its corresponding sprocket will first encounter the guard ring 40 and/or 41 and thus be deflected from entrance between the slack reach of the chain and sprocket teeth. Also, any leaves or stalk portions which are caught between the chain and the sprocket will tend to be chewed up, with the debris being expelled through the space between the sprocket teeth and the ring 40 and/or 41 and thus, the debris will not pile up on the sprocket teeth to damage the drive.

As will be evident from FIG. 2, in which the toe in or toe out of the drive wheels is slightly exaggerated, the upper reach of the forward chain 23 will be guided into the sprocket teeth by the rings 40 and 41. Similarly, the lower reach of the rear chain 24 will be guided by the rings 40 and 41 into the sprocket teeth. It will be noted that a separate chain drive to each wheel of the carriage is advantageous from the standpoint of traction and also advantageous when the device is made reversible.

Although this invention has been described with reference to an electric motor drive, it will be understood that it is applicable to a pneumatic or hydraulic drive arrangement with which drive chains and sprockets are utilized. While a preferred embodiment of this invention has been illustrated and described, it will be understood that various changes may be made therein, without departing from the spirit and scope of this invention.

What is claimed is:

1. In an elongated sprinkler having a series of substantially aligned, connected pipe sections and spaced supports therefor, means for sprinkling an area of land during movement of said sprinkler thereover, motorized drive means and means for controlling said drive means in response to a support moving ahead or behind an adjacent support, the improvement comprising:
 a drive wheel at each of the front and rear of a support, said motorized drive means being mounted on said support intermediate said drive wheels;
 a chain sprocket mounted on each drive wheel;
 a separate chain extending from said drive means to each wheel and engaging the sprocket thereof; and
 guard means associated with each sprocket for limiting the entry of foreign objects between said chain and the respective sprocket formed as a circular member affixed to each side of said sprocket.

2. In an elongated sprinkler system as set forth in claim 1, wherein:
 said circular member is rounded in a transverse direction.

3. In an elongated sprinkler having a series of substantially aligned, connected pipe sections and spaced supports therefor, means for sprinkling an area of land during movement of said sprinkler thereover, motorized drive means and means for controlling said drive means in response to a support moving ahead or behind an adjacent support, the improvement comprising:
 a drive wheel at each of the front and rear of a support, said motorized drive means being mounted on said support intermediate said drive wheels;
 a chain sprocket mounted on each drive wheel;
 a separate chain extending from said drive means to each wheel and engaging the sprocket thereof; and
 guard means associated with each sprocket and spaced circumferentially from each sprocket, for limiting the entry of foreign objects between said chain and the respective sprocket.

4. In an elongated sprinkler system, as set forth in claim 3, wherein:
 said guard means includes a circular rod at each side of said sprocket and spaced from the teeth of said sprocket.

5. In an elongated sprinkler system as set forth in claim 4, wherein:
 said circular rods are attached to opposite sides of said sprocket.

6. The sprinkler system set forth in claim 3, wherein:
 the guard means is adjacent to both points where the reaches of the chain move onto and from the chain sprocket for limiting the entry of foreign objects between the chain and the sprocket regardless of the direction in which the sprinkler support moves.

7. In an elongated sprinkler having a series of substantially aligned, connected pipe sections constructed to rotate about a central pivot at one end of the pipe sections and spaced supports therefor, means for sprinkling an area of land during movement of said sprinkler thereover, motorized drive means and means for controlling said drive means in response to a support moving ahead or behind an adjacent support, the improvement comprising:
 a drive wheel at each of the front and rear of a support, said motorized drive means being mounted on said support intermediate said drive wheels;
 said front wheel of said support is toed in toward said pivot and the rear wheel of said support is toed out and away from said pivot, the amount of such toeing corresponding to a tangent to the circle in which said support moves in moving around said pivot;
 a chain sprocket mounted on each drive wheel;
 a separate chain extending from said drive means to each wheel and engaging the sprocket thereof; and
 guard means associated with each sprocket for limiting the entry of foreign objects between said chain and the respective sprocket and to assist in guiding the chain onto the sprockets of the respective in-toed and out-toed front and rear wheels of said support.

8. In an elongated sprinkler system as set forth in claim 7, wherein:
 said guard means includes circular rods of rounded cross section attached to opposite sides of said sprockets and spaced from the teeth of said sprockets.

9. In an elongated sprinkler having a series of substantially aligned, connected pipe sections and spaced supports therefor, means for sprinkling an area of land during movement of said sprinkler thereover, motorized drive means and means for controlling said drive means in response to a support moving ahead or behind an adjacent support, the improvement comprising:
 a wheel at each of the front and rear of a support, said motorized drive means being mounted on said support intermediate the wheels and at least one of the wheels being a driven wheel;
 an open chain sprocket mounted on said driven wheel;
 an open chain extending from said drive means to the driven wheel and engaging the sprocket thereof with one reach of the chain, between the drive means and the sprocket constituting the slack reach which moves onto the sprocket; and
 a guard means associated with the sprocket, positioned adjacent to the point where the slack reach of the chain moves onto the chain sprocket for limiting the entry of foreign objects between the chain and the sprocket.

10. The sprinkler system set forth in claim 9, wherein:
 the guard means is mounted upon and extends circumferentially about the chain sprocket whereby a portion of the guard means is always adjacent to the point where the slack reach of the chain moves into the sprocket.

\* \* \* \* \*